United States Patent [19]

Koch

[11] Patent Number: 4,518,278

[45] Date of Patent: May 21, 1985

[54] CONNECTING DEVICE FOR DETACHABLY MAINTAINING FLAT STRUCTURES PERPENDICULAR TO EACH OTHER

[75] Inventor: Gerhard Koch, Nagold, Fed. Rep. of Germany

[73] Assignee: Hafele KG, Fed. Rep. of Germany

[21] Appl. No.: 456,608

[22] Filed: Jan. 10, 1983

[30] Foreign Application Priority Data

Feb. 11, 1982 [DE] Fed. Rep. of Germany ....... 3204737

[51] Int. Cl.³ .......................... B25G 3/00; F16B 7/08
[52] U.S. Cl. .................................. 403/230; 403/245; 403/407
[58] Field of Search ............... 403/189, 245, 246, 407, 403/405, 231

[56] References Cited

U.S. PATENT DOCUMENTS

| | | | |
|---|---|---|---|
| 3,410,584 | 11/1968 | Bus | 403/409 X |
| 3,694,821 | 10/1972 | Moritz | 403/115 X |
| 4,120,598 | 10/1978 | Zernig et al. | 52/285 X |
| 4,202,645 | 5/1980 | Giovannetti | 403/407 |
| 4,300,850 | 11/1981 | de la Haye et al. | 403/245 |

FOREIGN PATENT DOCUMENTS

| | | | |
|---|---|---|---|
| 2546749 | 4/1977 | Fed. Rep. of Germany | 403/407 |
| 2643354 | 3/1978 | Fed. Rep. of Germany | 403/353 |
| 1467282 | 12/1966 | France | 403/343 |

Primary Examiner—Dennis L. Taylor
Attorney, Agent, or Firm—Thomas W. Speckman

[57] ABSTRACT

A connecting device for detachable connection of two perpendicularly positioned panels, such as furniture panels, by means of a grooved fastener bolt fastened in the first panel and a tightening bolt rotatably mounted in a blind bore of the second panel. The tightening bolt is mounted in a first blind bore in the second panel and the fastener bolt is adapted to be inserted into a second blind bore in the second panel perpendicular to the first bore. The tightening bolt is in operative engagement with the head of the fastener bolt in such a manner that as the tightening bolt is rotated the fastener bolt is pulled into the second blind bore firmly joining the two panels.

10 Claims, 5 Drawing Figures

CONNECTING DEVICE FOR DETACHABLY MAINTAINING FLAT STRUCTURES PERPENDICULAR TO EACH OTHER

BACKGROUND OF THE INVENTION

This invention relates to a connecting device for detachably joining two boards or panels in a perpendicular relationship to each other, particularly furniture panels, in which the first panel is fitted with a fastener bolt having a head set apart from the shank by a circumferential groove and the second panel is provided with a first blind bore for rotatably receiving a cylindrical tightening member. The fastener bolt is inserted into a second blind bore provided in the second panel, whereby the axis of rotation of the tightening member and the axis of the first blind bore receiving such tightening member are perpendicular to the longitudinal axis of the fastener bolt and the second blind bore and are lying in the plane extending through the longitudinal axis of the fastener bolt and the first blind bore receiving the fastener bolt. The tightening member is in operative engagement with the head of the fastener bolt in such a manner that, as the tightening member is rotated, the fastener bolt is pulled into the appropriate blind bore, whereby the two panels are joined. Except for the grooved bolt section, the shank and the head of the fastener bolt have the same diameter.

The tightening member is provided with a tightening bore extending transversely to its axis of rotation and providing a proper fit for the head of the fastener bolt, and with an adjacent tightening slot the edges of which extend into the grooved section of the fastener bolt.

A detachable connecting mechanism of this general type is disclosed in German Patent Specification DE-OS No. 22 02 906. In this disclosure, the tightening member is in the form of a latch embracing the head of a fastener bolt from both sides with tightening discs or plates parallel to the plane of the second panel and guiding the bolt head in a circumferential slot. As the tightening latch is rotated, a force component acts also on the fastener bolt in the direction of rotation of the latch, which leads to a displacement of the bolt along its longitudinal axis with respect to the axis of rotation of the tightening latch. This has the result of the second panel being shifted sideways from the first panel during the tightening procedure. Moreover, in order to obtain a sufficiently large tightening distance, the diameter of the tightening latch must be substantially larger than the diameter of the fastener bolt.

German Patent Specification DE-OS No. 30 28 684 discloses a tightening member likewise in the form of a bolt. However, the type of tightening member taught by this disclosure requires a specific lateral relocation of the blind bores in the second panel.

SUMMARY OF THE INVENTION

It is an object of the present invention to provide a connection device of the foregoing type in which a clearly defined axial adjustment of the fastener bolt toward the axis of rotation of the tightening member is achieved by means of a tightening member having a small diameter and with the orientation of the axis of rotation of the tightening member with respect to the longitudinal axis of the fastener bolt being maintained.

This is accomplished according to the present invention in that the head of the fastener bolt is in the form of an at least hemispherically shaped cap, the curved side of which forms a part of the wall of the tightening groove, and that the tightening member is in the shape of a tightening bolt. The tightening bore is cylindrical in shape up to the axis of rotation of the tightening bolt and then merges into a hemispherical shaped cup. The tightening slot runs the entire length of the side wall of the tightening bolt up to the lowest point of the hemispherical cup forming part of the tightening bore.

In this construction of the fastener head of the fastener bolt and the tightening bore of the tightening bolt, the fastener head inserted into the tightening bore is guided on all sides except for the cutout forming the tightening slot, so that the laterally acting force components are intercepted and lateral dislocation of the fastener bolt is safely prevented. The longitudinal axis of the fastener bolt remains in proper orientation to the axis of rotation of the tightening bolt throughout the entire fastening procedure or distance covered by the fastener bolt. The tightening slot in this construction permits utilization of the entire distance available for the adjustment of the fastener head in the bore of the tightening bolt. Moreover, the extent of the locking movement is limited by the tightening slot of the tightening bore in the tightening bolt, and since the tightening bore is opened by the slot from one side only, the tightening bolt is prevented from being turned back past the input position of the fastener bolt. Thus, the input position simultaneously defines also the open or unlocked position of the connecting members.

A sufficiently large abutment surface of the bore in the tightening bolt for engagement with the head of the fastener bolt is obtained according to one embodiment, in that the hemispherical cap has a radius which corresponds to the radius of the fastener bolt so that the diameter of the tightening bore and the hemispherical cup forming a part of the tightening bolt likewise correspond to the diameter of the fastener bolt.

A positive self-locking end position of the locking movement of the tightening bolt is achieved according to another embodiment, when the construction is such that the end portion of the tightening slot of the bore of the tightening bolt terminates in a semicircular abutment section having a radius which corresponds to about one-half of the width of the tightening slot.

To sufficiently secure the fastener head to the shank of the fastener bolt, a further embodiment of the invention provides for the diameter of the grooved section of the fastener bolt and thus the width of the tightening slot of the tightening bolt to be about one-third of the diameter of the fastener bolt.

BRIEF DESCRIPTION OF THE DRAWINGS

The invention will be described in further detail with reference to an exemplary embodiment illustrated in the drawings, in which.

DESCRIPTION OF PREFERRED EMBODIMENTS

Figure 1:
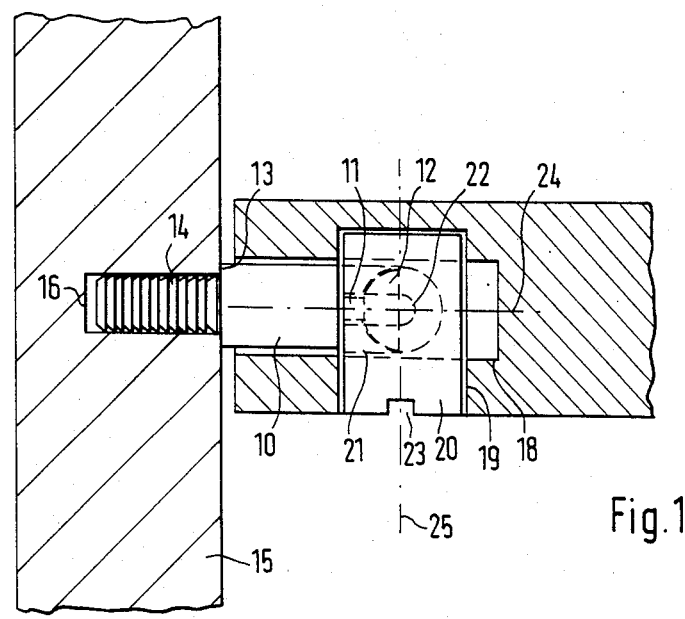
FIG. 1 is a partial cross-sectional side view of the detachable connection between two furniture panels, along line 1—1 shown in FIG. 2 showing the fastener bolt and the tightening bolt.
Figure 2:
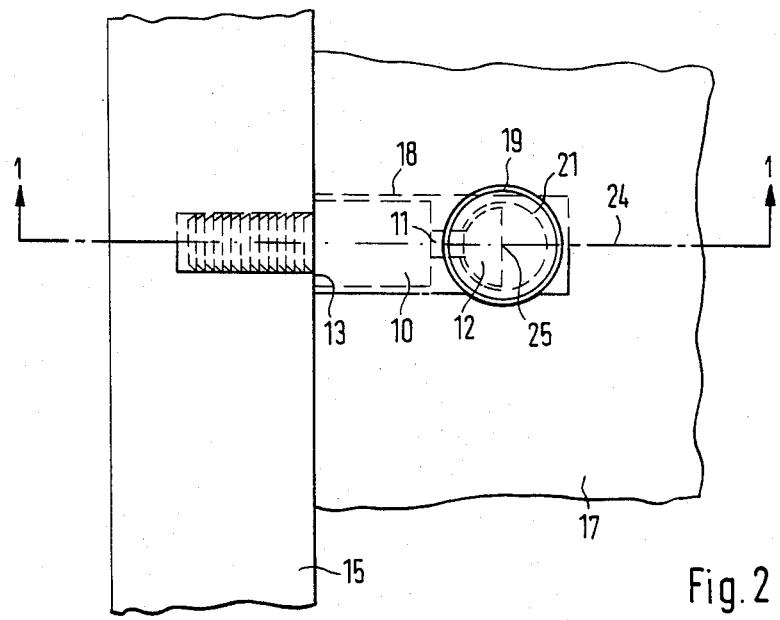
FIG. 2 is a top plan view of the detachable connection of FIG. 1 showing the second furniture panel having a blind bore therein for receiving the tightening bolt.

FIGS. 1 and 2 show first panel 15 with fastener bolt 10 fastened therein. This is accomplished by introducing fastening section 14, having barbs or catches, into blind bore 16 in first panel 15, until shoulder 13 on the shank of bolt 10 rests against first panel 15. Fastener head 12 is in the shape of a hemispherical cap, the curved side of which forms a part of the wall of an attachment groove and the plane side forms the end portion of fastener bolt 10. Fastener head 12 has the same diameter as the shank of fastener bolt 10. The hemispherical cap-shaped head 12 merges into cylindrical grooved section 11, the radius of which is smaller than the radius of the adjacent shank portion of fastener bolt 10. The stepped transitional section between cylindrical grooved section 11 and the shank of fastener bolt 10 forms the other wall of the attachment groove. The diameter of cylindrical grooved section 11 corresponds to about one-third of the diameter of fastener bolt 10 so that fastener head 12 is sufficiently firmly joined to the shank of fastener bolt 10. Slot 22 of tightening bore 21 in tightening bolt 20 are of the same dimensions. The fastener bolt 10 is inserted into blind bore 18 in second panel 17. Blind bore 18 is located in the middle of the front edge of second panel 17 and extends parallel to its faces. The diameter of blind bore 18 is adapted to accommodate the exposed length of fastener bolt 10 fastened to first panel 15 so that fastener bolt 10 is axially adjustable in blind bore 18 a distance such that the second panel is capable of being tightly joined to first panel 15.

Figure 3:
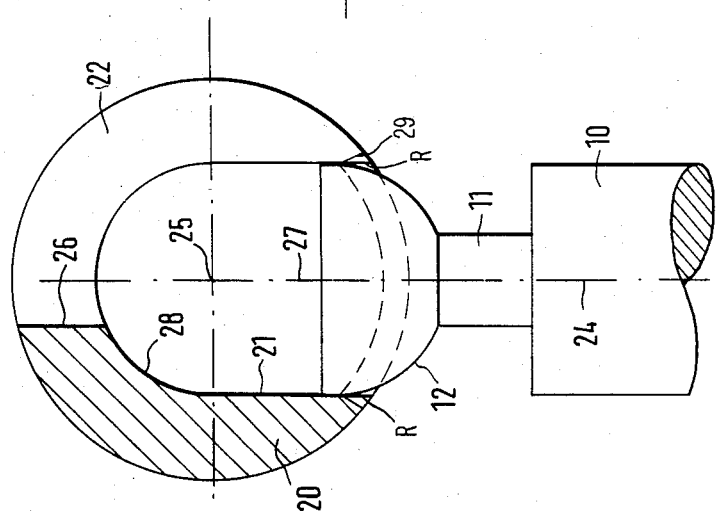
FIG. 3 shows schematically in partial section along line 3—3 shown in FIG. 5 the mutual disposition of the fastener bolt and the tightening bolt in the input or unlocked position.

This is accomplished by means of tightening bolt 20. Tightening bolt 20 is rotatably mounted in blind bore 19 drilled from one face into second panel 17. The axis of rotation 25 of tightening bolt 20 lies in a plane which is perpendicular to the longitudinal axis 24 of fastener bolt 10 and the axis of blind bore 18 receiving tightening bolt 20, so that these two axes intersect. This particular orientation of the blind bores 18 and 19 facilitates their being drilled into second panel 17. Moreover, the tensioning forces transferred from tightening bolt 20 to fastener head 12 of fastener bolt 10 act along the longitudinal axis 24 of fastener bolt 10 whereby any canting and jamming of fastener bolt 10 in blind bore 18 is prevented. Tightening bolt 20 is inserted into blind bore 19 in such a manner that its face having slot or notch 23 therein is flush with the face of second panel 17. The manner as to how tightening bolt 20 is put into operative engagement with fastener bolt 10 and the particular mechanics of such operative engagement will be described with reference to FIGS. 3 to 5.

Figure 5:
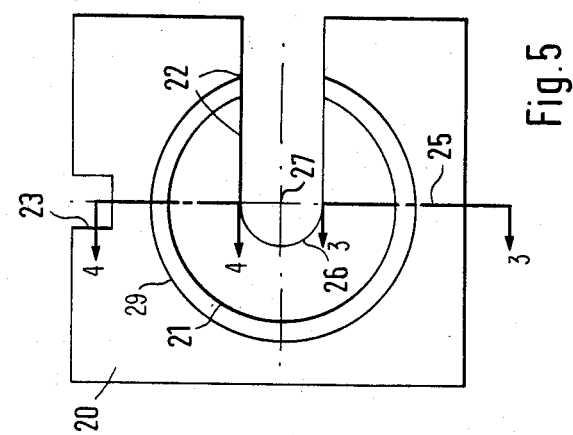
FIG. 5 a side view of the tightening bolt.
Figure 4:
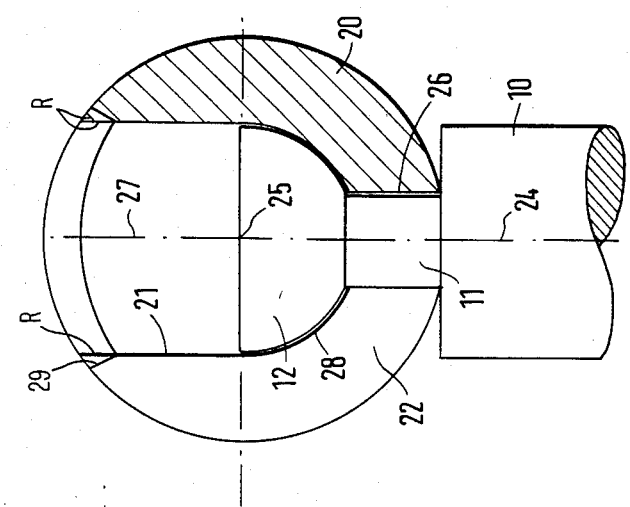
FIG. 4 shows schematically in partial section along line 4—4 shown in FIG. 5 the mutual disposition of the fastener bolt and the tightening bolt in the locked position.

Tightening bolt 20, shown in a side view in FIG. 5, is provided with a tightening bore 21 directed transversely to the axis of rotation 25. The diameter of bore 21 is such as to accommodate the diameter of fastener bolt 10. To enable the head 12 of fastener bolt 10 to be inserted into tightening bore 21, tightening bolt 20 needs to be so oriented that the bore axis 27 coincides with the longitudinal axis 24 of fastener bolt 10. To facilitate insertion of fastener bolt 10, tightening bore 21 may be provided with a conically enlarged inlet opening 29. In this input position shown in FIG. 3, it is possible to insert head 12 of fastener bolt 10 into tightening bore 21 of tightening bolt 20 a distance until the second panel 17 is drawn to and abuts first panel 15. Thereupon, tightening bolt 20 is rotated clockwise into its locking position, as shown in FIG. 4. In so doing, head 12 of fastening bolt 10 is drawn some distance into tightening bore 21 of tightening bolt 20 until second panel 17 is tightly secured against first panel 15.

In order to obtain a sufficiently long tightening distance, the diameter of tightening bolt 20 is larger than the diameter of fastener bolt 10 and corresponds to about 1.5 to 2 times the diameter of fastener bolt 10. Tightening bore 21 extends up to the axis of rotation 25 of tightening bolt 20 and past that point terminates in a hemispherical cup 28 of the same radius, as it is clearly shown in FIGS. 3 and 4. To enable tightening bolt 20 in operative engagement with head 12 of fastener bolt 10 to be rotated in tightening bore 21, slot 22 is provided to open the tightening bore 21 including its hemispherical end section 28 from one side for tightening slot 22 to receive and guide grooved section 11 of fastener bolt 10.

As is shown in FIG. 5, slot 22 intersects a semi-cylindrical portion of tightening bolt 20 in a plane which is perpendicular to the axis of rotation 25 of tightening bolt 20 and parallel to axis 27 of tightening bore 21. The section of slot 22 facing away from the input opening of bore 21 extends with its semicircular abutment 26 past the middle of tightening bolt 20 so that in the terminal locking position longitudinal axis 24 of fastener bolt 10 again is in alignment with axis 27 of bore 21. FIG. 4 clearly shows that the axial length of grooved section 11 of fastener bolt 10 is equal to one-half of the difference between the diameter of tightening bolt 20 and the diameter of fastener bolt 10. Moreover, the width of the slot 22 should correspond approximately to the diameter of cylindrical grooved section 11 of fastener bolt 10, and semicircular abutment 26 has a radius which corresponds to one-half of the diameter of grooved section 11 of fastener bolt 10. Thus, tightening bolt 20 is capable of being rotated a maximum of 180° from the input or open position shown in FIG. 3 into the locked position shown in FIG. 4.

The rotational movement of tightening bolt 20 is limited, first, by the wall portion of tightening bore 21 opposite slot 22, which wall portion serves as a stop for head 12 of fastener bolt 10, and secondly, by semicircular stop 26 of tightening slot 22 abutting grooved section 11 of fastener bolt 10.

I claim:

1. Connecting device for detachably maintaining flat panels perpendicular to each other comprising: a fastener bolt having a head (12) set apart from a shank portion by a reduced cylindrical section (11), said head and said shank portions having the same diameter and said cylindrical section having a substantially smaller diameter than said head and said shank portions, said head (12) of said fastener bolt (10) adjacent said cylindrical section being in the form of a hemispherically shaped cup, the curved side of which forms one side and the stepped transition from said shank portion to said reduced cylindrical section forms the opposite side of an attachment groove; and a cylindrical tightening bolt (20) having cylindrical tightening bore (21) sized for receipt of said fastener bolt head and perpendicular to and extending up to the axis of rotation (25) of said tightening bolt (20) and then merging into a hemispherical cup (28) sized to mate with said hemispherically shaped cup and having tightening slot (22) extending the length of the side wall of said tightening bore (21) up to said hemispherical cup (28) forming a part of said tightening bore (21); said fastener bolt fastening to the first said panel with said shank, said attachment groove and said head protruding therefrom, said tightening bolt rotatably received in a first blind bore provided in the second said panel, said fastener bolt inserted into a second blind bore provided in the second said panel, whereby the axis of rotation of said tightening bolt and the longitudinal axis of said first blind bore receiving said tightening bolt are perpendicular to the longitudinal axes of said fastener bolt and said second blind bore, and are lying in a plane extending through the longitudinal axes of both said fastener bolt and said first blind bore, said tightening bolt operatively engaging said head of said fastener bolt in such a manner that said tightening slot of said tightening bore is engaged in said attachment groove, and as said tightening bolt is rotated, said fastener bolt is pulled along its longitudinal axis into said second blind bore causing the two panels to be firmly joined, said tightening bolt being capable of being rotated up to about 180° from its initial input position.

2. Connecting device of claim 1 wherein the diameters of said tightening bore (21) and said hemispherical cup (28) being the same as the diameter of said head of said fastener bolt (10).

3. Connecting device of claim 2 wherein the diameter of said tightening bolt (20) is larger than the diameter of said head of said fastener bolt (10), the axial length of said reduced cylindrical section (11) of said fastener bolt (10) is equal to one-half of the difference between the diameter of said tightening bolt (20) and the diameter of said head of said fastener bolt (10), and that the width of said tightening slot (22) of said tightening bolt (20) is equal to the diameter of said reduced cylindrical section (11) of said fastener bolt (10).

4. Connecting device of claim 1 wherein the diameter of said tightening bolt (20) is larger than the diameter of said head of said fastener bolt (10), the axial length of said reduced cylindrical section (11) of said fastener bolt (10) is equal to one-half of the difference between the diameter of said tightening bolt (20) and the diameter of said head of said fastener bolt (10), and that the width of said tightening slot (22) of said tightening bolt (20) is equal to the diameter of said reduced cylindrical section (11) of said fastener bolt (10).

5. Connecting device of claim 4 wherein the end portion of said tightening slot (22) of said tightening bolt (20) terminates in a semicircular abutment (26) having a radius equal to about one-half of the width of said tightening slot (22).

6. Connecting device of claim 1 wherein the end portion of said tightening slot (22) of said tightening bolt (20) terminates in a semicircular abutment (26) having a radius equal to about one-half of the width of said tightening slot (22).

7. Connecting device of claim 5 wherein said tightening bore (21) of said tightening bolt (20) is provided with a conically enlarged inlet opening (29).

8. Connecting device of claim 1 wherein said tightening bore (21) of said tightening bolt (20) is provided with a conically enlarged inlet opening (29).

9. Connecting device of claim 7 wherein the diameter of said reduced cylindrical section (11) of said fastener bolt (10) and the width of said tightening slot (22) of said tightening bolt (20) is equal to about one-third of the diameter of said head of said fastener bolt (10).

10. Connecting device of claim 1 wherein the diameter of said reduced cylindrical section (11) of said fastener bolt (10) and the width of said tightening slot (22) of said tightening bolt (20) is equal to about one-third of the diameter of said head of said fastener bolt (10).

* * * * *